US006185262B1

United States Patent
Brandstetter

(10) Patent No.: US 6,185,262 B1
(45) Date of Patent: Feb. 6, 2001

(54) METHOD FOR SUPPRESSING DISTURBANCES IN A BIPOLAR DATA STREAM AND A CIRCUIT CONFIGURATION FOR CARRYING OUT THE METHOD

(75) Inventor: Markus Brandstetter, Freiberg (DE)

(73) Assignee: Infineon Technologies AG, Munich (DE)

(*) Notice: Under 35 U.S.C. 154(b), the term of this patent shall be extended for 0 days.

(21) Appl. No.: 09/507,357

(22) Filed: Feb. 18, 2000

Related U.S. Application Data

(63) Continuation of application No. PCT/DE98/02180, filed on Jul. 30, 1998.

(30) Foreign Application Priority Data

Aug. 18, 1997 (DE) .............................................. 197 35 752

(51) Int. Cl.[7] .................................................. H04L 25/34
(52) U.S. Cl. .......................... 375/289; 375/229; 375/230; 375/232; 375/233; 333/18; 333/28 R
(58) Field of Search .................................. 375/289, 229, 375/230, 232, 233, 346, 345; 333/18, 28 R, 295; 708/323

(56) References Cited

U.S. PATENT DOCUMENTS

| | | | |
|---|---|---|---|
| 4,459,698 | 7/1984 | Yumoto et al. | 375/16 |
| 4,768,205 | 8/1988 | Nakayama | 375/14 |
| 5,257,286 | 10/1993 | Ray | 375/12 |
| 5,448,589 | * 9/1995 | McKibben | 375/230 |
| 5,481,564 | * 1/1996 | Kakuishi et al. | 375/230 |
| 5,880,645 | * 3/1999 | Everitt et al. | 333/18 |
| 5,991,339 | * 11/1999 | Bazes et al. | 375/232 |

FOREIGN PATENT DOCUMENTS

| | | |
|---|---|---|
| 29 42 075 C2 | 6/1989 | (DE) . |
| 33 08 903 C2 | 7/1990 | (DE) . |
| 0 656 694 A2 | 6/1995 | (EP) . |

OTHER PUBLICATIONS

Non–Patent Document "PEB 2095 ISDN Two–Wire Transmission Device" (Smolka et al.), pp. 17–21.

Non–Patent Document "IEEE Journal of Solid–State Circuits", dated Dec. 1987, vol. SC–22, No. 6, (ISSN 0018–9200).

Non–Patent Document "Line Equalizer for a Digital Subscriber Loop Employing Switched Capacitor Technology" (Suzuki et al.), Manuscript received Feb. 12, 1982, 0090–6778/82/0900–2074, pp. 2074–2082.

* cited by examiner

*Primary Examiner*—Stephen Chin
*Assistant Examiner*—Mohammad Ghayour
(74) *Attorney, Agent, or Firm*—Herbert L. Lerner; Laurence A. Greenberg; Werner H. Stemer

(57) ABSTRACT

Disturbances in a bipolar signal in the case of large line lengths are suppressed. The signal is led to a coarse setting and a fine setting in an equalizer and to a downstream level detector. From there it is fed back to the equalizer via a control device. Sampling is performed in this case with the aid of a measuring clock pulse. The sampling clock pulse is dimensioned such that undersampling is carried out. Three reference levels are used, from which one digital sampled signal is derived in each case. A coarse setting or fine setting is initiated as a function of a percentage-prescribed number of upper and lower threshold violations.

10 Claims, 4 Drawing Sheets

METHOD FOR SUPPRESSING DISTURBANCES IN A BIPOLAR DATA STREAM AND A CIRCUIT CONFIGURATION FOR CARRYING OUT THE METHOD

CROSS-REFERENCE TO RELATED APPLICATION

This is a continuation of copending International Application PCT/DE98/02180, filed Jul. 30, 1998, which designated the United States.

BACKGROUND OF THE INVENTION

1. Field of the Invention

The invention relates to a method for suppressing disturbances in a bipolar data stream in the case of large line lengths. The signals of the data stream are fed to a coarse adjustment and a fine adjustment in an equalizer and to a downstream level detector. From there they are fed back to the equalizer from the level detector via a control device. The invention also relates to a circuit configuration for carrying out the method.

Particularly in the case of stringent requirements on range for the reception of ISDN data, problems can arise in intersymbol interference, modulation of the amplitudes by power supply interference sources, interference from high-frequency sources and direct crosstalk from neighboring transmission lines. In addition, continuous operation without interruption of reception requires a low bit error rate (1E-7) and is therefore exposed to the full temperature response over its entire operating time. Moreover, the relevant standards permit variations in transmitted amplitude of up to 50% and a bit rate variation of +/−13%. At the same time, there is a requirement for the automatic capability to adapt to arbitrary cable lengths within the specified ranges. Depending on cable type, for example, in the T1 standard these can be between 0 and 2000 meters or between 0 and 2800 meters.

Since the signal-to-noise ratio worsens continually with increasing length of the transmission link, ever more stringent requirements have to be placed on the equalizer and/or the equalizer itself produces bit errors because of constant corrections in continuous operation.

It has been known to date to transmit and evaluate at the start of transmission standard signals which serve as training pulses or reference pulses. Such a method and the associated arrangements are described by T. Suzulei et al. in the article "Line Equalizer for a Digital Subscriber Loop Employing Switched Capacitor Technology"; IEEE Transactions on Communications, Vol. COM-30, No. 9, September 1982, pp. 2074–82. Such an arrangement is also known from U.S. Pat. No. 4,768,205.

Methods are also used which require a perpetually continuous correction, or which render restrictions necessary with regard to the amplitude variation and the tolerated noise.

Furthermore, methods are known which work with a multiplicity of detection levels and/or fixed detection levels. A method in which fixed detection levels are used for regulation is described by G. J. Smolka et al. in the article "A 384-kbit/s ISDN Burst Transceiver"; IEEE Journal of Solid State Circuits, Vol. SC-22, No. 6, December 1987, pp. 1004–10. It is disadvantageous in these last-mentioned methods that erroneous settings cannot be prevented in some circumstances, depending on the technology used. Moreover, the outlay on circuitry rises very sharply for longer ranges. Furthermore, in such cases the influence of pulsed interference sources or individual interference events is seen very clearly on the receiving path of the equalizer, and they lead to bit errors.

SUMMARY OF THE INVENTION

The object of the invention is to provide a method and a device for suppressing disturbances in a bipolar data stream which overcomes the above-noted deficiencies and disadvantages of the prior art devices and methods of this kind, and which permit acceptable reception, although they are exposed to a multiplicity of interference sources, and which nevertheless ensure a fine reception balance which is of sufficiently fine resolution in conjunction with an immediate reaction upon violation of absolute interference limits.

With the above and other objects in view there is provided, in accordance with the invention, a method of suppressing disturbances in a bipolar data stream transmitted through a long transmission line. The method comprises the following method steps:

subjecting a disturbed, bipolar data stream to one of a coarse and fine adjustment in an equalizer;

subsequently comparing the data stream with three reference levels in a level detector;

forming a signal in case of a level violation of a reference level;

sampling the signal in the level detector with a measuring clock pulse to form a digital sampled signal and supplying the digital sampled signal to a control device;

stochastically evaluating the level violation represented by the sampled signal in the control device, and setting the equalizer with the control device as a function of the result of the evaluation, the setting comprising the following:

coarsely setting the equalizer when a percentage number of level transgressions of a lower reference level undershoots a first lower decision threshold or when a percentage number of level transgressions of an upper reference level overshoots a first upper decision threshold; and finely setting the equalizer when the percentage number of level transgressions of the upper reference level undershoots the first upper decision threshold or when the percentage number of level transgressions of the lower reference level overshoots the first lower decision threshold.

In accordance with an added feature of the invention, the equalizer is not set with the control device and it is considering adjusted when the percentage number of level transgressions of the middle reference level corresponds with the percentage number of level transgressions prescribed by a second upper decision threshold and a second lower decision threshold.

In accordance with an additional feature of the invention, there is provided a step of stochastically evaluating, with a tendency controller influencing the control device, the level violations represented by the sampled signal and, as a function thereof, changing the decision thresholds, prescribed in the control device, for the purpose of regulation such that coarse or fine settings of the equalizer lead to an adjustment.

In accordance with another feature of the invention, the signal formed by violations of the reference levels is undersampled with a measuring clock pulse.

In accordance with a further feature of the invention, the measuring clock pulse corresponds to three times a clock pulse length of a sequence of 18 binary signals.

In accordance with again an added feature of the invention, the third reference level is defined between the upper reference level and the lower reference level such that a level spacing of D=F+S is observed, wherein S represents a sum of all disturbances to be taken into account, F represents the fine setting range of the equalizer, and F and S are fixed as $$\frac{F}{2} + S = \frac{A}{2}$$

to form a control range A=c−a of the equalizer.

In accordance with again an additional feature of the invention, the percentage-prescribable number of violations of the upper reference level and lower reference level is set as a function of a prescribed amplitude variation of the data stream.

In accordance with again another feature of the invention, after concluding the fine setting of the equalizer, the middle reference level in the control device is replaced by a data stream produced from the data stream output by the equalizer with the aid of a voltage peak detector and a downstream receiver.

With the above and other objects in view there is also provided, in accordance with the invention, a circuit configuration for performing the above-outlined method. The novel circuit includes:

an equalizer having an automatic gain controller for fine setting and a filter for coarse setting of a signal amplitude;

a level detector connected to the equalizer via a signal line;

a control device connected to the level detector via lines, the control device controlling the equalizer via a line;

a tendency controller for influencing the fine setting and coarse setting connected to the control device via a bidirectional line; and a voltage peak detector connected to the equalizer and a receiver connected to the voltage peak detector and to the control device, the voltage peak detector and the receiver processing a data stream received from the equalizer via the signal line, feeding back the processed data stream to the control device, and outputting the processed data stream.

In accordance with a concomitant feature of the invention, the control device is adapted to stochastically evaluate the level violations represented by the sampled signal, and the tendency controller influences the control device via the bidirectional line and changes the decision thresholds, prescribed in the control device, for the purpose of regulation such that coarse or fine settings of the equalizer lead to an adjustment of the equalizer.

The invention has the advantage that it is based on a principle of complete feedback, and that there is no need to observe the direct input signal. All that is required are three reference levels and the data signal available from the recovery of the digital input signal. The use of median filtering in the feedback path results in a high degree of immunity to impulsive disturbances without a reduction in detective capability.

A basic idea of the invention consists in replacing the permanently prescribed decision thresholds used in the prior art by decision thresholds which are based on a statistical evaluation. It is therefore possible to use a tendency of the threshold violation as a decision criterion for countermeasures. Isolated violations of a reference level therefore do not lead to undesired correction. Rather, stochastic disturbances are mutually cancelled by averaging, and it is thereby possible to initiate in a precisely adjusted fashion either a coarse setting or only a fine adaptation. Superfluous coarse settings are thereby avoided. There is a consequent softening in the requirements placed on the control range in conjunction with a reduced supply voltage, thus enabling use with larger ranges. Statistical evaluation, and the avoidance of unnecessary coarse settings it entails, lead to a higher rate of setting, with the result that it is possible to operate with low bit error rates.

The method according to the invention results in a widening of the available control range, and thus in a reduction in the outlay on circuitry, because fewer switching stages are required, or conversely in a reduction in the possible operating voltage. It is thereby possible to open up applications with a low operating voltage and very long equalizer ranges.

A great advantage is also to be seen in that only one amplitude measurement is required to carry out the method. The use of undersampling has the advantage that no high-frequency reference clock pulse is required, and that the outlay with regard to the counting factor and register can be kept low. The feedback branch manages with a small bandwidth.

An optimum stochastic database is obtained by virtue of the fact that the measuring period comprises three zero clock pulse lengths. It is thereby possible to make an even better decision as to whether to carry out a coarse setting or a fine setting. Although an even higher accuracy can be achieved by a further increase in the number of zero clock pulse lengths, on the other hand the adaptation period of the equalizer is lengthened, and so it seems overall that the three-fold zero clock pulse length is particularly suitable as measuring period.

Zero clock pulse length is understood to be a data stream with a minimum density of logic "1" signals, that is to say a data stream with 15 "0" signals and 3 "1" signals.

Other features which are considered as characteristic for the invention are set forth in the appended claims.

Although the invention is illustrated and described herein as embodied in a method for suppressing disturbances in a bipolar data stream, and a circuit configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
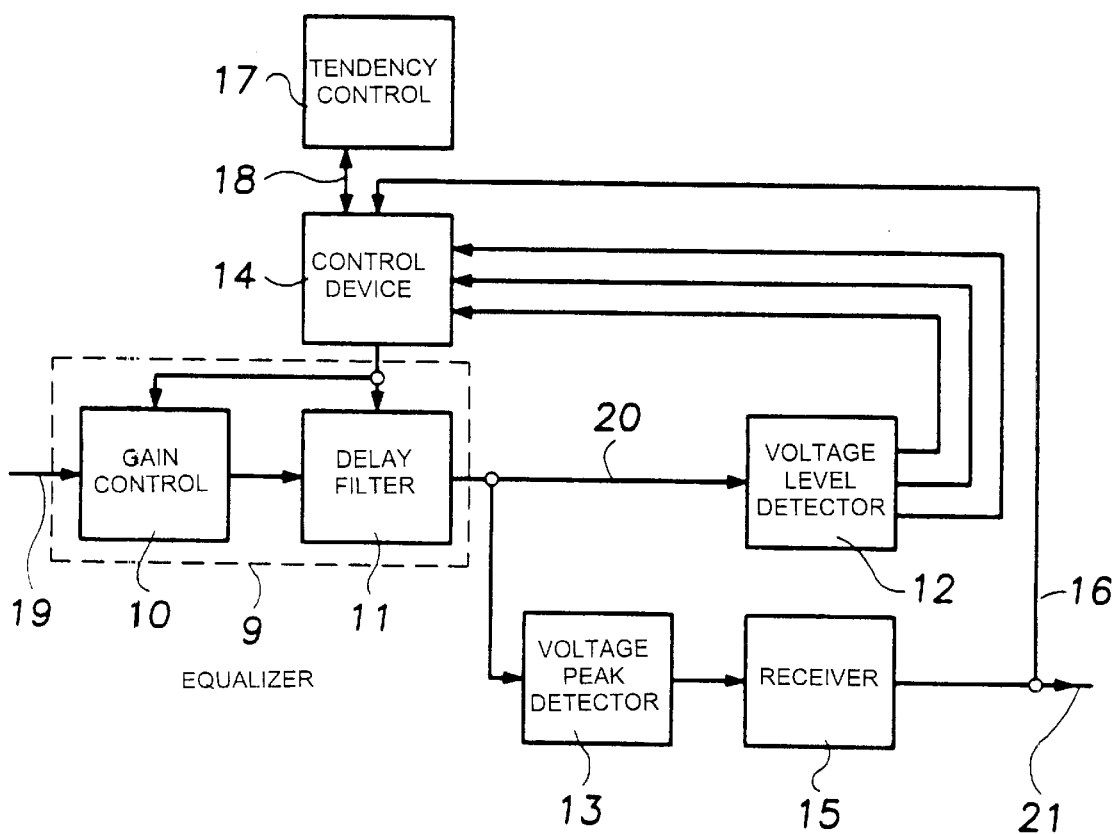
FIG. 1 is a block diagram of a circuit configuration for suppressing disturbances in a bipolar data stream.

Referring now to the figures of the drawing in detail and first, particularly, to FIG. 1 thereof, there is seen an equalizer 9 which receives a data stream comprising bipolar signals. The equalizer 9 has an automatic gain controller 10 (also termed AGC) and a group delay filter 11 whose output is connected in parallel with a voltage level detector 12 and a voltage peak detector 13.

The voltage level detector 12 has three outputs, which are connected to a control device 14 by forming a feedback loop. The control device 14 is applied both to the automatic gain controller 10 and to the group delay filter 11. Moreover, the output of the voltage peak detector 13 is connected to a receiver 15 at whose output the reconstructed data stream is present for applying to the downstream transmission link. The reconstructed data stream is fed back to the control device 14 via a feedback line 16. A tendency controller 17 is connected to the control device 14 via a bidirectional connection 18.

Figure 2:
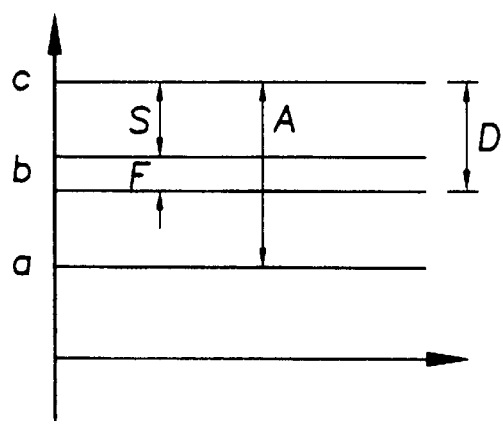
FIG. 2 is a schematic of three reference levels such as are used in the circuit configuration according to FIG. 1.

The data stream that arrives from a transmission link on a receiving path 19 is affected by a multiplicity of typical disturbances caused by transmission. The amplitude is reset to a constant nominal value, and the data signals are reconstructed in the gain controller 10 and in the downstream delay filter 11 of the equalizer 9. For this purpose, the voltage characteristic at the equalizer output 20 is checked for violations of the levels a, b, c by the voltage level detector 12, which uses three reference levels a, b, c, as these are represented in FIG. 2. Situated between a lower reference level a and an upper reference level c for coarse setting of the gain controller 10 and of the group delay filter 11 is a middle reference level b for fine setting which is at a level spacing D from the upper reference level c. In the case of a control range A of the gain controller 10 and of the group delay filter 11 which determines the spacing of the lower and upper reference levels a, c, the level spacing D is determined by the sum S of all disturbances to be taken into account, and the fine setting bandwidth F of the gain controller 10 and group delay filter 11, that is to say D=F+S, is determined by the relationship $$\frac{F}{2} + S = \frac{A}{2}$$

(referred to the level $$C - S - \frac{F}{2}$$

in a logarithmic representation).

Moreover, the analog output signal of the group delay filter 11 is converted in the voltage peak detector 13 and in the receiver 15 to form the regenerated bipolar data signal, which can be tapped at the data line 21 on the output side.

The switching stages of the gain controller 10, and the characteristic of the group delay filter 11 and, in association therewith, the coarse and fine settings are adjusted via the control device 14 as a function of the output signals of the voltage detector 12 and the receiver 15. This setting is also influenced by the tendency controller 17, in which the evaluation criteria for the signals arriving in the voltage level detector 12 and from the receiver 15 are either permanently prescribed for the purpose of control, or are corrected in accordance with selectable criteria for the purpose of regulation.

Figure 3:
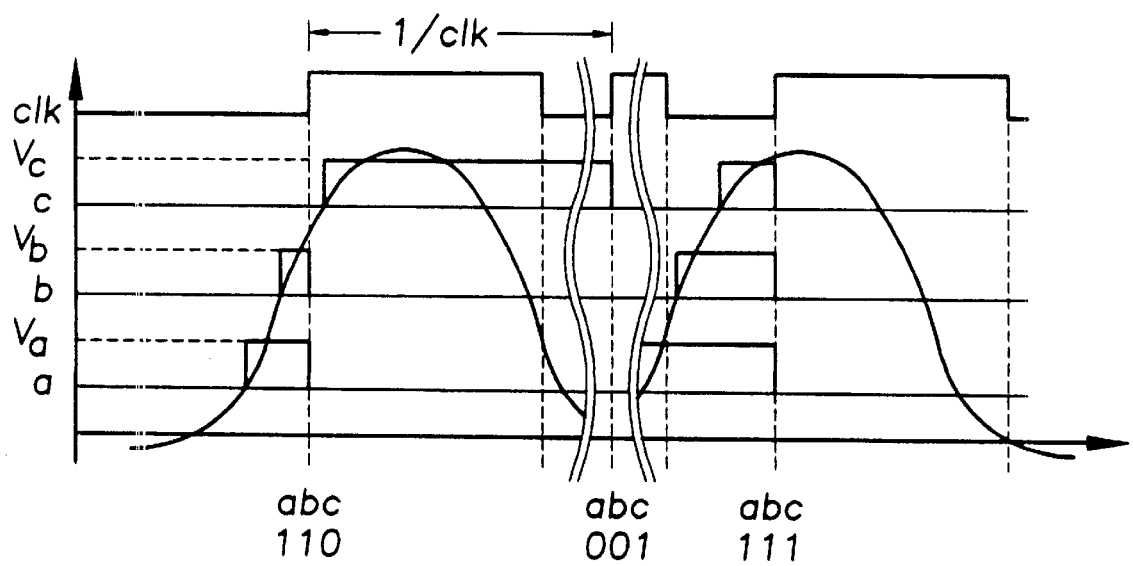
FIG. 3 is a schematic of undersampling of a voltage characteristic in the case of three reference levels corresponding to FIG. 2.

With reference to FIG. 3, the sampling of the amplitude in the voltage level detector 12 is performed by means of undersampling with the aid of a measuring clock pulse clk and a measuring period T which corresponds to the three-fold zero clock pulse length. In the case of a violation of one of the three reference levels a, b, c, a digital signal $V_a$, $V_b$ and $V_c$ is triggered in each case. With a rising edge of the clock pulse signal T, these signals are evaluated as digital measurement signal abc and fed to the control device 14. The Fig. represents by way of example three measurement instants which illustrate three digital measurement signals abc 110, 001 and 111. It is to be understood that the stochastically existing possibility of erroneous level interpretation because of undersampling is taken into account in the evaluation.

In a setting phase, the level violations determined in this way are subjected to a stochastic evaluation using the principle of event median filtering of the reference levels in the control device 14. The evaluation is based on the circuit criteria which are fed in by the tendency controller 17.

Figure 4:
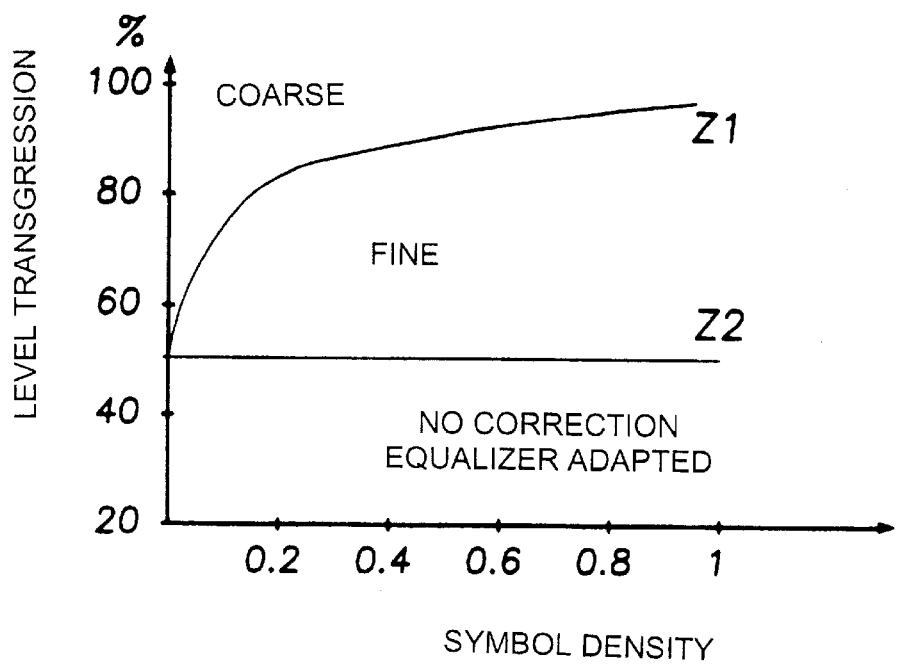
FIG. 4 is a chart showing the behavior of the circuit configuration in accordance with FIG. 1 in the case of the upper level evaluation.
Figure 5:
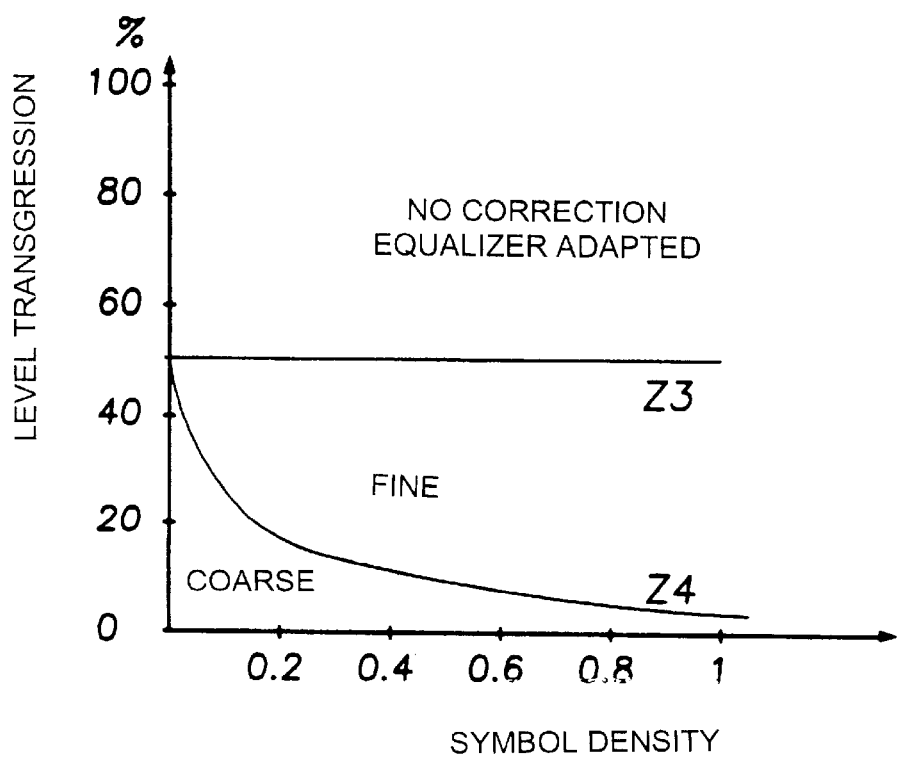
FIG. 5 is a chart showing the behavior of the circuit configuration in accordance with FIG. 1 in the case of the lower level evaluation.

The behavior of the control device 14 is illustrated with the aid of the decision criteria, represented by way of example in FIGS. 4 and 5, for evaluating the upper reference level c or the lower reference level a. Here, it holds in the coarse setting phase and fine setting phase that a first and a second decision threshold Z1 or Z4 and Z2 or Z3 are determined which, in the event of percentage-prescribed level transgressions, lead to a coarse setting or fine setting or to no correction, depending on the symbol density of the data stream. In the examples represented in FIGS. 4 and 5, decision thresholds Z1 to Z4 are prescribed in each case which are based on a percentage level transgression of 50%, that is to say the number of the pulses of the data stream whose amplitude overshoots the decision thresholds during the coarse setting phase or fine setting phase is 50%.

Consequently when the number of the pulses which overshoot the first decision threshold Z1 for the upper reference level c and the fourth decision threshold Z4 for the lower reference level a is 50%, there is a change to the fine setting. Consequently, when in the fine setting phase, in turn, there is overshooting of the middle level b in accordance with the decision thresholds Z2 and Z3 by 50%, a state is assumed in which no correction is performed and the gain controller 10 and the group delay filter 11 are set. This state is then subjected to regulation in a verification phase.

Coarse settings are required, for example, in the case of switching over a transmission link or of a sudden reduction in the signal amplitude, the lower reference threshold a being overshot, for example, only at a ratio of 5%. This requires correction which is as fast and clear as possible.

Fine settings are required, for example, when the transmitter applied on the input side to the circuit configuration, or the power supply of the existing circuit configuration leaves the prescribed operating range, or when non-specified stochastic interference sources occur which are situated outside the frequency band suppressed in terms of circuitry by the median filter length. In such cases, the operation is to be maintained as long as possible. However, since effects occur which violate the lower reference level in a creeping fashion, a fine setting is triggered when the 50% threshold of the median filter arrangement is reached. This is more likely to lead to no bit errors the lower the symbol density, and does not violate the permissible bit error rate. Thus, the above-described evaluation leads to an even more robust behavior of the control device 14, without in the process violating the requirements for maximum use of the control range, the long term stability and the speed of reaction to massive changes up to coarse setting.

In the verification phase, long term effects such as self-heating of the receiver path or drifting of the voltage level of the transmitter are considered. The system causes the reconstructed signal amplitudes to vary and move relative to one another in the permitted band of amplitudes which are limited by the lower and upper reference levels a, c. In order optimally to fill the requirement triangle described above, there is carried out in the verification phase a stochastic evaluation which takes account of the percentage-prescribable number of threshold violations, and therefore distinguishes between fine setting and coarse setting. In the verification phase, the middle reference level b is no longer fixed by the corresponding output signal of the voltage level detector 12, but by the regenerated data stream via the feedback line 16.

Figure 6:
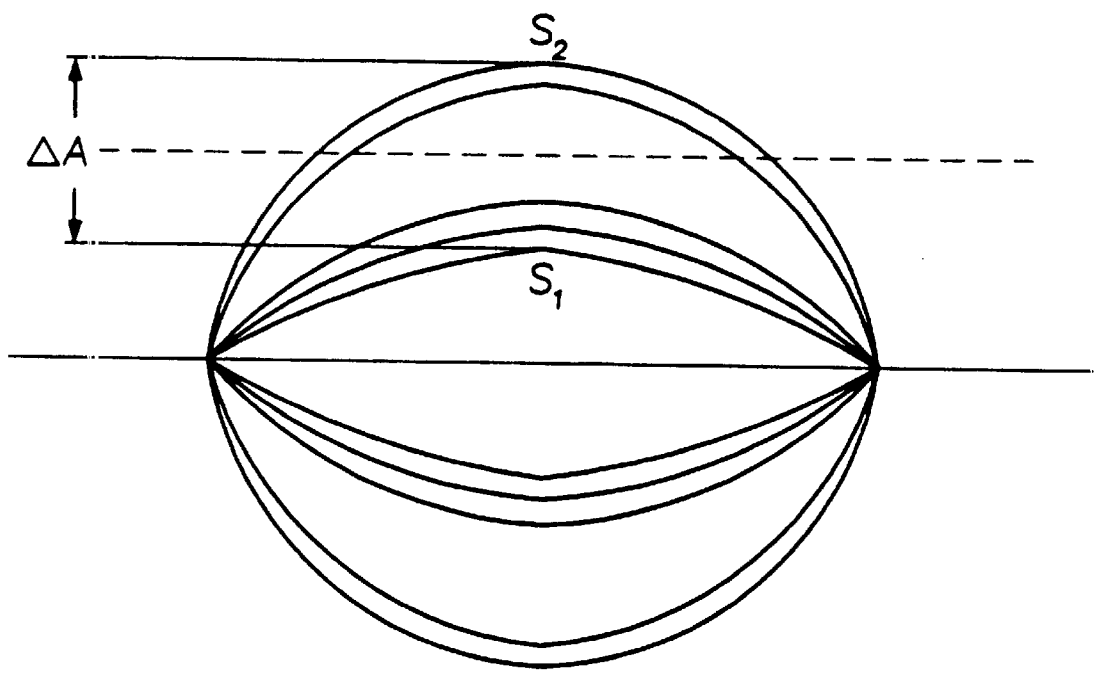
FIG. 6 shows a schematic of an example of amplitude variation in the data stream with the aid of an eye pattern.

In order, in the case of a drastic change in the data stream statistics, for example from a continuous-one signal on the basis of a link alarm to an idle data signal with a minimum signal-one density, to prevent rejection of the fine setting or termination of the verification phase, amplitude variations on the basis of the varying, stochastically distributed pulse density in the data stream are also permitted. Such amplitude variation is illustrated in FIG. 6 by means of an eye pattern of a reconstructed signal characteristic, which is located during operation of the equalizer 9 in the permitted edge region around the middle reference level b. $S_1$ denotes the path of the denser signals, and $S_2$ denotes the path of the individual pulses or of the low signal density. The range resulting from the amplitude variation is denoted by ΔA.

The evaluation of the level violations of the lower and upper reference levels a, c is therefore performed according to a preferred embodiment of the invention in a fashion that also takes into account the possible amplitude variations illustrated in FIG. 6.

A further preferred embodiment consists in that it is possible to use the tendency controller 17 to switch over the percentage-prescribable number of lower and upper threshold violations during operation. This has the advantage that the method is even more tolerant of more solid stochastic interference sources. If the success of this evaluation is used (stochastically), in turn, for switching over, regulation is achieved. In the case of such regulation, a prescribable number of fine settings are checked for their success. If no success is determined after a specific number, the percentage number, prescribed for these experiments, of threshold violations is changed again.

I claim:

1. A method of suppressing disturbances in a bipolar data stream transmitted through a long transmission line, which comprises:
    subjecting a disturbed, bipolar data stream to one of a coarse and fine adjustment in an equalizer;
    subsequently comparing the data stream with three reference levels in a level detector;
    forming a signal in case of a level violation of a reference level;
    sampling the signal in the level detector with a measuring clock pulse to form a digital sampled signal and supplying the digital sampled signal to a control device;
    stochastically evaluating the level violation represented by the sampled signal in the control device, and setting the equalizer with the control device as a function of the result of the evaluation, the setting comprising the following:
        coarsely setting the equalizer when a percentage number of level transgressions of a lower reference level undershoots a first lower decision threshold or when a percentage number of level transgressions of an upper reference level overshoots a first upper decision threshold; and
        finely setting the equalizer when the percentage number of level transgressions of the upper reference level undershoots the first upper decision threshold or when the percentage number of level transgressions of the lower reference level overshoots the first lower decision threshold.

2. The method according to claim 1, which comprises not setting the equalizer with the control device and considering the equalizer adjusted when the percentage number of level transgressions of the middle reference level corresponds with the percentage number of level transgressions prescribed by a second upper decision threshold and a second lower decision threshold.

3. The method according to claim 1, which comprises stochastically evaluating, with a tendency controller influencing the control device, the level violations represented by the sampled signal and, as a function thereof, changing the decision thresholds, prescribed in the control device, for the purpose of regulation such that coarse or fine settings of the equalizer lead to an adjustment.

4. The method according to claim 1, which comprises undersampling the signal formed by violations of the reference levels with a measuring clock pulse.

5. The method according to claim 4, wherein the measuring clock pulse corresponds to three times a clock pulse length of a sequence of 18 binary signals.

6. The method according to claim 1, which comprises defining the third reference level between the upper reference level and the lower reference level such that a level spacing of D=F+S is observed, wherein S represents a sum of all disturbances to be taken into account, F represents the fine setting range of the equalizer, and F and S are fixed as $$\frac{F}{2} + S = \frac{A}{2}$$

to form a control range A=c−a of the equalizer.

7. The method according to claim 1, which comprises setting the percentage-prescribable number of violations of the upper reference level and lower reference level as a function of a prescribed amplitude variation of the data stream.

8. The method according to claim 1, which comprises, after concluding the fine setting of the equalizer, replacing the middle reference level in the control device by a data stream produced from the data stream output by the equalizer with the aid of a voltage peak detector and a downstream receiver.

9. A circuit configuration for suppressing disturbances in a bipolar data stream transmitted through a transmission line, comprising:
    an equalizer having an automatic gain controller for fine setting and a filter for coarse setting of a signal amplitude;
    a level detector connected to said equalizer via a signal line;
    a control device connected to said level detector via lines, said control device controlling said equalizer via a line;
    a tendency controller for influencing the fine setting and coarse setting connected to said control device via a bidirectional line; and
    a voltage peak detector connected to said equalizer and a receiver connected to said voltage peak detector and to said control device, said voltage peak detector and said receiver processing a data stream received from said equalizer via said signal line, feeding back the processed data stream to said control device, and outputting the processed data stream.

10. The circuit configuration according to claim 9, wherein said control device is adapted to stochastically evaluate the level violations represented by the sampled signal, and said tendency controller influences said control device via the bidirectional line and changes the decision thresholds, prescribed in said control device, for the purpose of regulation such that coarse or fine settings of the equalizer lead to an adjustment of the equalizer.

* * * * *